(No Model.)
C. CARTER.
PACKING RING.
No. 368,189. Patented Aug. 16, 1887.
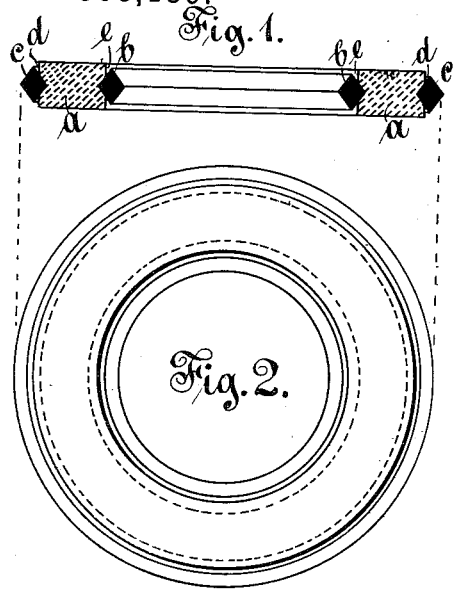
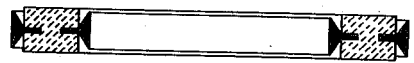
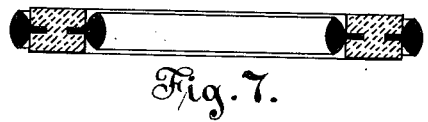
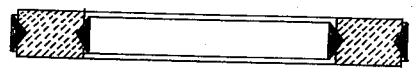
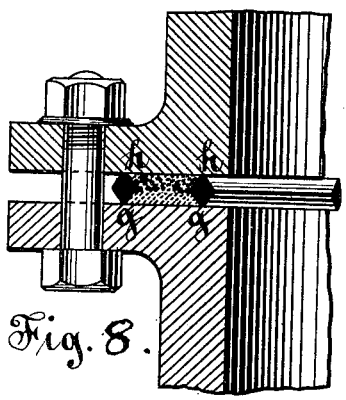
Witnesses:
Charles A. Saal
Wm. Rosenbaum
Inventor
Claude Carter
by W. J. Johnston
Attorney

UNITED STATES PATENT OFFICE.

CLAUDE CARTER, OF LEVENSHULME, NEAR MANCHESTER, COUNTY OF LANCASTER, ENGLAND.

PACKING-RING.

SPECIFICATION forming part of Letters Patent No. 368,189, dated August 16, 1887.

Application filed February 25, 1887. Serial No. 228,809. (No model.)

*To all whom it may concern:*

Be it known that I, CLAUDE CARTER, a subject of the Queen of Great Britain, and a resident of Levenshulme, near Manchester, in the county of Lancaster, England, have invented certain new and useful Improvements in Packing-Rings, of which the following is a specification.

My improvements relate to rings or washers placed as packings between the flanges of steam or other pipes for making the joints; and it consists in combinations of india rubber rings or washers with other rings made of soft metal or soft alloys of metals, and with special shapes or sections. Where india-rubber rings alone are used, the rubber is liable to be squeezed partly out of the joints into the inside of the pipes or out on the outer edges of the flanges, and remains exposed to the internal pressure in the pipes, tending to force it out of the joint and to the action of the steam or fluids contained in the pipes, which in many cases rapidly deteriorates the rubber and causes the joint to become leaky. In order to obviate these defects, I combine the india-rubber rings or washers with soft-metal rings of special shape, which, when the joint is tightened up by the bolts, fit against the flanges and inclose the india-rubber both on the inside and the outside, and thus protect it against the action of the fluids contained in the pipes and prevent it being squeezed out of the joint.

In order that my invention may be more readily ascertained and carried into effect, I have hereunto appended a sheet of drawings, marked with letters of reference, which forms part of this specification.

Figures 1, 3, 4, 5, 6, and 7 are sectional views showing different constructions of my improved packing-ring. Fig. 2 is a plan of the construction shown in Fig. 1. Fig. 8 is a sectional view of a pipe-joint, showing my improved packing-ring in position.

One combination, for the purpose hereinbefore set forth, is shown by Fig. 1 in section and by Fig. 2 in plan; and it consists in an india-rubber ring, $a$, of rectangular section, having a circular V-shaped groove formed in the middle of its inner and outer surfaces, and into these grooves I place the corners of an internal ring, $b$, and an external ring, $c$, made of lead or soft copper or soft-metal alloys, suitable for the fluid and pressure in the pipes. These rings may have a diamond-shaped or rhomboidal section, as shown on Fig. 1, or a triangular section with straight sides, as shown on Fig. 3, or may have curved sides, but must be so shaped that one corner fits into the groove in the india-rubber ring and two other corners bear against the flanges when these are drawn together by the bolts. The groove is of such depth that the india-rubber covers only a part of the sides of the metal ring placed in it, leaving conical hollows $d$ $e$ between the rubber and metal ring on each side, and the india-rubber ring is made of such thickness that when the combined joint-ring is placed between the flanges of two pipes, and these are drawn together by bolts till they touch the corners of the metal rings, the rubber fills these conical hollow spaces $d$ and $e$, or nearly fills them. When the bolts are further tightened, the corners of the metal rings are flattened by the flanges, and as the rubber cannot expand or escape laterally it is strongly pressed against the flanges and makes a tight joint against them. At the same time the metal rings exclude the steam or other fluid in the pipe from the rubber on the inside and prevent it from acting on the rubber, while the outer ring protects it from the action of the air, or against damage through oil or grease on the outside of the joint. The rings may also be made of a lens-shaped section with two convex sides, and the grooves in the india-rubber ring made concave, but of less depth than the convex sides of the rings fitting into it, as shown in section on Fig. 4.

Instead of fitting into V-shaped or concave grooves, as hereinbefore described, the metal rings may be formed at their middle parts next to the rubber with flat rims or projections extending into the rubber ring, which in that case may be molded with recesses for their reception, or more conveniently made in two pieces placed on each side of the metal rings and cemented together.

Figs. 5, 6, and 7 show sections of joint-rings made in this manner.

I claim as my invention—

1. A packing-ring for joints, consisting of the combination of a rubber ring with two metallic rings embracing the inner and outer surfaces of the said rubber ring, in the manner set forth.

2. The combination, with a rubber ring, of two soft-metal rings, each provided with two sharp edges for the purpose specified, the said rubber ring located or pressed between the two metallic rings, as described.

3. A packing-ring built up of three rings, one of rubber and two of soft metal, the metal rings being of different diameters and carrying the rubber ring between them, as set forth.

4. A packing-ring made up of three rings, one of rubber and two of soft metal, the shape of each ring being such as to leave triangular annular grooves in the ring, into which the rubber ring may be forced by the pressure of the flanges of the joint between which the packing is inserted.

In testimony that I claim the foregoing as my invention I have signed my name, in presence of two witnesses, this 1st day of February, 1887.

CLAUDE CARTER.

Witnesses:
CARL BOLLÉ,
SAMUEL ECROYD.